Nov. 21, 1939.    E. M. CLAYTOR    2,180,796

VOLTAGE CONTROL SYSTEM

Filed Oct. 29, 1937

INVENTOR
Edward M. Claytor
BY
ATTORNEY

UNITED STATES PATENT OFFICE 2,180,796

VOLTAGE CONTROL SYSTEM

Edward M. Claytor, Anderson, Ind., assignor to General Motors Corporation, Detroit, Mich., a corporation of Delaware Application October 29, 1937, Serial No. 171,668

3 Claims. (Cl. 290—7)

This invention relates to the control of a variable speed generator, and has for a principal object, to provide a reliable, efficient and economical control device for regulating a generator in order to limit the output at high speed, so it or any current consuming device connected thereto will not be injured.

In the art of electric generation for charging of storage batteries, where the generator is driven by a variable speed motor or prime mover, such as an automotive engine, or a wind motor, the output of the generator varies substantially as the speed of the generator varies, and there is frequently attendant upon the high speed operation of the generator, a voltage output that would be detrimental to the battery, or the equipment itself, particularly so if the high speed operation continues over a substantial period of time. There is likely to result an overcharge of the battery, overload of the generator, or burn out of the generator and circuit connections. Various devices have been suggested for the control of this high output, and include complicated and costly devices such as manually and centrifugally operated switches, and electric relays, for switching in of additional batteries, resistances and other correcting means. The invention herein, contemplates a simple and inexpensive device for controlling the maximum output of the generator automatically, when the output of the generator becomes so high as being likely to result in injury to the equipment, and the instant invention contemplates a control of the kind stated, irrespective of whether the generator be driven by an automotive engine, or a wind operated propeller, etc.

The aim and object of this invention is accomplished by making use of a current of air from the engine cooling fan, or a current of air operating the wind driven generator, for actuating a control device adapted to alter the generator output. A resistance unit with taps is connected into the field circuit of the generator, and a switching device responding to the air currents created by or surrounding the prime mover operates automatically to cut out resistance of the field circuit as the speed of the prime mover, and consequently the generator, is reduced, and adds resistance to the field circuit, as the speed of the prime mover and consequently the generator increases, the controlling device thereby reducing the maximum output of the generator when it approaches that value that would result in the contemplated injury.

In one disclosed embodiment, an oscillatable vane, responsive to air movement, is disposed in the path of the air blast from the cooling fan, and actuates a switching mechanism for variably controlling the resistance of the field of the generator. In another disclosed embodiment, the air current control of the generator is combined with a lighting switch control, so that one is able to step up the output of the generator to compensate, at least in part, for lights or other current consuming devices that may be connected to the generator, but at the same time prevent excessive output of the generator that might injure it or any device connected to it.

Further objects and advantages of the present invention will be apparent from the following description, reference being had to the accompanying drawing wherein a preferred embodiment of the present invention is clearly shown.

Figure 1:
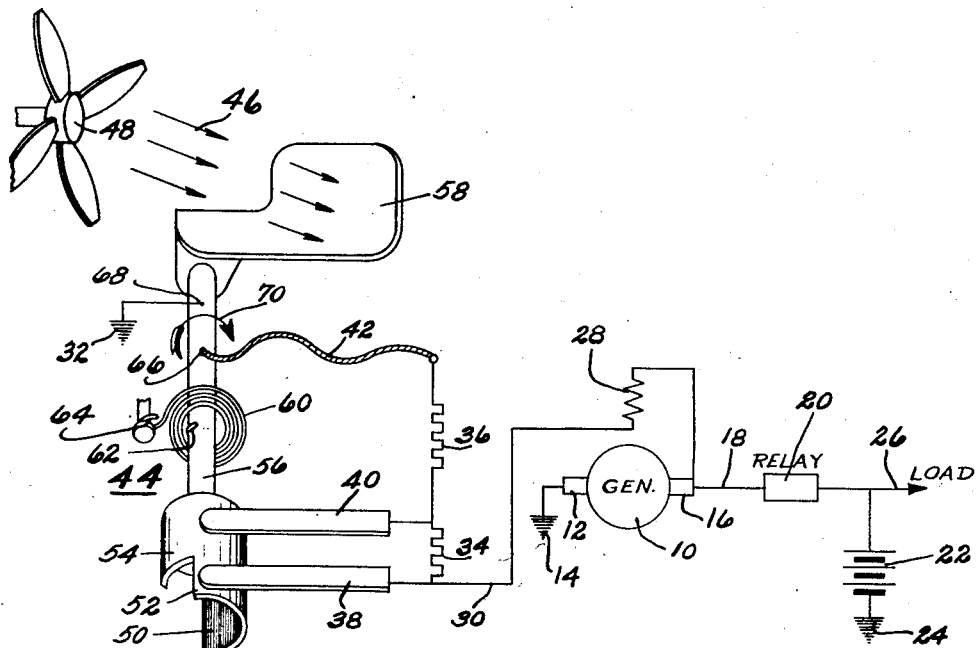
Fig. 1 is a schematic diagram of a voltage control system illustrating the instant invention, the elements of the control units being shown in pictorial form.

With particular reference to the drawing, illustration is herein made as respects the application of the invention to a system of generator installation upon an automotive vehicle. This installation comprises a generator 10 of the shunt wound type, having a brush 12 providing a ground connection at 14, and a brush 16 from which a conductor 18 leads to a cut-out relay 20, and thence to a battery 22 having a ground connection at 24. Suitable connections are provided for load circuits from the battery, as indicated by the legend and arrow indicated at 26. Also to the brush 16 there is connected a field winding 28 from which a conductor 30 makes the usual return ground connection 32, which in this instance is accomplished through the controlling device hereinafter to be described.

In circuit with the field winding 28 and the lead 30, there is connected a resistance comprising portions 34 and 36, with taps or connectors 38, 40 and 42 taken off at appropriate places so as to effect by-passing or inclusion of the various resistance portions with respect to the field circuit of the generator. To accomplish this switching arrangement, a fluid operated device such as an air switch 44, is calibrated to respond to the air stream 46 from an engine cooling fan 48, and is adapted to operate at different potentials of the air stream to cut in and out selected portions of the field resistance. More specifically, the air switch 44 comprises a drum contactor 50, having the stepped portions 52 and 54, adapted to engage and disengage respectively the contact elements 38 and 40, connected to the resistance elements. The contact drum 50 is actuated by means of a shaft 56 responding to the oscillation of a wind vane or paddle 58, upon which impinges the air stream 46, a return spring 60 being anchored at 62 and 64 for effecting return oscillation of the shaft when the potential of air stream 46 falls off. The end lead 42 of the resistance is bonded to the shaft of the air switch at 66, while the ground connection 32 is indicated as being completed with the shaft 56 as at 68.

As to the operation of the control thus far described, it is contemplated and assumed that the prime mover by which the generator is driven at variable speeds will also drive the cooling fan 48, which will likewise be driven at variable speeds and throughout substantially the same order of variation. In practice, this is accomplished by those actual installations wherein both the generator 10 and the cooling fan 48 are driven by one and the same belt. When the engine is operating at low speeds substantially all of the external resistance will be by-passed from the field winding of the generator, since the generator field 28 then has its return circuit through the lead 30 to the contactor 38, contact drum 50, shaft 56 and to ground 32 through 68. During operation under these conditions, the potential of the air stream 46 from the cooling fan 48 is insufficient to oscillate the vane 58, and therefore, if the output of the generator 10 is sufficient to actuate the relay 20, this generator output will be communicated to the battery 22, which will result in its being charged. On an increase speed of the prime mover, the cooling fan 48 will be attended by an increase of speed, as also will the generator 10. The increased speed of the generator 10 will manifest in a greater output of electrical energy for charging the battery. When the speed of the engine is increased to that point where the output of the generator may be detrimental to the battery or generator, the force of the air blast 46 from the cooling fan is sufficient to oscillate the shaft of the air switch in the direction indicated by the arrow 70, and this oscillation rotates the drum contact 50 until the contact member 38 is disengaged from the cooperating part 52 and rests upon an appropriate insulator that may form a part of the contact drum. Under these conditions the by-pass connection to ground around the resistance 34 is interrupted, and the return connection to the field winding 28 is thence from the lead 30 through the resistance portion 34, contactor 40, drum 50, shaft 56 and thence through 68 to ground at 32. A portion of the external resistance is thereby inserted in the field winding 28 of the generator, which will correspondingly cut down the output of the generator, and thus prevent overloading the generator or overcharging of the battery while operating at that speed.

A further increase of engine speed similarly operates, by reason of the increased potential of the air blast 46, to further rotate the shaft 56 and drum 50 until the return path of the field winding through the contact portions 40 and 54 are interrupted. Under those conditions, both resistance elements 34 and 36 will be inserted in the return circuit from the field winding 28, that return circuit then being completed by the connector 42, and thence through 66, 70 and 68 to ground at 32. The maximum output of the generator as it is delivered to the battery is thus reduced to a safe value to prevent overcharging of the battery.

Figure 2:
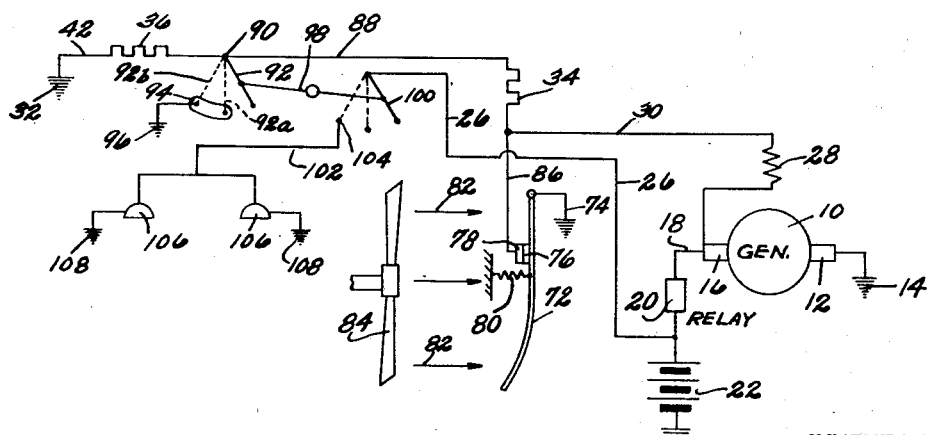
Fig. 2 is a diagrammatic illustration of a voltage control system in combination with manually selective means for modifying the automatic regulation.

According to the illustration of Fig. 2, the principle of the above described control is supplemented by a manual or optional control that makes for compensation of energy drawn from the battery when any load device is connected thereto, and also makes for accelerated restoration following excessive or long continued use of the load circuits. Here, the air switch 72 completes a ground connection at 74 and provides a single movable contact 76 adapted to engage a fixed contact 78 through the force of a spring urging means 80 which likewise restrains oscillation of the vane of the air switch due to the air stream 82 emanating from actuation of the cooling fan 84. The fixed contact 78 of the air switch communicates by means of a lead 86 with the generator return lead 30, and thereby completes the by-passing means for the resistances 34 and 36, when the air switch contacts 76 and 78 are closed. In this instance the resistance portions 34 and 36 are joined by a lead 88 brought to a common terminal 90 of a switch arm 92 that plays over an elongated contact 94 having a ground connection at 96. The extreme end of the resistance 36 is connected to ground 32 through the connector 42 similar to that of the first embodiment. The switch arm 92 is mechanically connected by means of a link member 98 to the arm 100 of a controlling switch for the respective load devices. The switch 100 is inserted in the load circuit 26 and is adapted to connect to the source any selected device such as lamps, radio, car heater, etc. In the illustrated embodiment the load device has been illustrated as an illumination circuit, including a lead 102 engaging a terminal 104 and communicating with a pair of lamps 106 which have a ground connection at 108. The coupling means 98 between the switch elements 92 and 100 is only illustrative, since this invention contemplates other means for making the switch arm 92 either independently or coincidentally operable with the closing of any selected work circuit. The switch elements 92 and 100 have ben illustrated in the off position, with dotted line showings for the purpose of indicating that, when desired, the switch element 92 may be moved to position 92a when no load circuit will be closed, and to a position 92b where a load circuit will be closed.

As in the embodiment of Fig. 1, the output of the generator will normally be unaffected while the engine and generator are operating at relatively low speeds, since the return circuit of the field winding 28 from the lead 30 passes through the lead 86, the air switch contacts 78, 76 and to ground at 74. During higher speeds of engine and generator operation the air stream from the cooling fan 84 operates to open the contacts 76, 78 under which conditions the resistance portion 34 and perhaps the resistance portion 36 will be included in the return circuit from the field winding 28, which incidentally will cut down the maximum output of the generator and thereby prevent the battery overcharge. The extent to which the generator output is reduced is also under manual and semi-automatic control. The manual or optional control depends on whether or not the switch element 92 be in the full line position or in that of 92a. If in the full line position, then the resistance portion 36 will be included in the return connection to the field winding in addition to the resistance portion 34, and the output of the generator will be reduced to a minimum for the high speed operation. Assuming that the battery may be low in potential and that it is desirable to increase the charging rate, even though driving at high speed, the switch element 92 is then moved to the position 92a, whereupon the resistance portion 36 will be by-passed, and the return circuit from the field winding 28 will include only the resistance 34 with its connecting lead 88, switch element 92, contact member 92 and to ground at 96. It is contemplated that in this position, where the switch element 92 is mechanically coupled with the switch element 100, that the latter will be on a neutral point and thus will not control any load circuit. These being the conditions, there are manual provisions made for generator output regulation, that are superimposed upon the automatic regulation by means of the air switch.

The semi-automatic control contemplates movement of the switch element 92 to the position 92b, wherein the same ground return is provided for the field winding 28 with an attendant by-passing of the resistance portion 36 as a compensatory measure for the load circuit established by the switch element 100 resting on the point 104 which results in the energization of the lamps 106.

It will be appreciated that a reduction in engine speed operates to by-pass all of the external resistance in the field circuit since the vane of the air switch is spring urged to return at the moment of sufficient potential drop in the air stream 46. In that instance the generator will be restored to its full efficiency output. During low speed operation of the motor and generator, or while the air switch contacts are closed, the superimposed control illustrated in Fig. 2 will be ineffective, since the return circuit from the generator field 28 will thence be through the air switch contacts which by-passes all of the resistance in the field circuit there illustrated.

While the embodiment of the present invention as herein disclosed, constitutes a preferred form, it is to be understood that other forms might be adopted, all coming within the scope of the claims which follow.

What is claimed is as follows:

1. In a system of electrical supply and control, wherein a storage battery as a current source for electrical devices is maintained in charged condition by a generator driven at widely varying speeds of a prime mover, the combination comprising, a resistance in circuit with the generator field, an air operated switch having normally closed contacts for by-passing the resistance, and operable at a predetermined speed of the prime mover to insert in the field circuit of the generator at least a part of the resistance, and means responsive to completing a circuit from the source to an electrical device for cutting out of the field circuit, at least a part of the resistance.

2. In a system of electrical supply and control, wherein a storage battery as a current source for electrical devices is maintained in charged condition by a generator driven at widely varying speeds of a prime mover, the combination comprising, a resistance in circuit with the generator field, and means operable to alter the generator field resistance for maintaining the generator output between predetermined limits, said means including an air switch responding to air currents at a selected potential for reducing the generator output under high speed operation of the generator, and means coincidentally operable with energizing a circuit from the battery to an electrical device for increasing the generator output to compensate for the additional load on the source.

3. In a system of electrical supply and control, wherein a storage battery as a current source for electrical devices is maintained in charged condition by a generator driven at widely varying speeds of a prime mover, the combination comprising, a resistance in circuit with the generator field, and means operable to alter the generator field resistance for maintaining the generator output between predetermined limits, said means including an air switch with normally closed contacts by-passing the resistance and operable at a predetermined air speed to insert the resistance in the generator field circuit, and means under manual control for varying the amount of resistance in the field circuit when the air switch contacts are open.

EDWARD M. CLAYTOR.